(12) United States Patent
Achan et al.

(10) Patent No.: US 12,026,285 B2
(45) Date of Patent: Jul. 2, 2024

(54) METHODS AND APPARATUSES FOR IDENTIFYING PRIVACY-SENSITIVE USERS IN RECOMMENDER SYSTEMS

(71) Applicant: Walmart Apollo, LLC, Bentonville, AR (US)

(72) Inventors: Kannan Achan, Saratoga, CA (US); Durga Deepthi Singh Sharma, Bangalore (IN); Behzad Shahrasbi, Santa Clara, CA (US); Saurabh Agrawal, Bangalore (IN); Venugopal Mani, Sunnyvale, CA (US); Soumya Wadhwa, Sunnyvale, CA (US); Kamiya Motwani, Madhya Pradesh (IN); Evren Korpeoglu, San Jose, CA (US); Sushant Kumar, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 419 days.

(21) Appl. No.: 17/162,295

(22) Filed: Jan. 29, 2021

(65) Prior Publication Data

US 2022/0245282 A1    Aug. 4, 2022

(51) Int. Cl.
*G06F 21/62*   (2013.01)
*G06N 20/00*   (2019.01)
*G06Q 30/0601* (2023.01)

(52) U.S. Cl.
CPC ......... *G06F 21/6263* (2013.01); *G06N 20/00* (2019.01); *G06Q 30/0601* (2013.01)

(58) Field of Classification Search
CPC ...... G06Q 30/0601; G06N 3/08; G06N 20/00; G06F 21/6263
See application file for complete search history.

(56) References Cited

U.S. PATENT DOCUMENTS

| 7,966,663 | B2 | 6/2011 | Strickland et al. |
| 9,530,024 | B2 | 12/2016 | Li et al. |
| 10,673,876 | B2 | 6/2020 | Sites et al. |
| 10,681,060 | B2 | 6/2020 | Scheidler et al. |
| 2013/0340086 | A1* | 12/2013 | Blom ................. G06F 21/6245 726/26 |
| 2019/0236661 | A1* | 8/2019 | Hogg ................. G06Q 30/0641 |
| 2021/0185076 | A1* | 6/2021 | Miller ................. H04L 63/107 |
| 2021/0334403 | A1* | 10/2021 | Luus ..................... G06N 3/088 |

OTHER PUBLICATIONS

Homer et al., "Aggregating Vulnerability Metrics in Enterprise Networks using Attack Graphs", 2013, p. 1-37.

* cited by examiner

*Primary Examiner* — Olugbenga O Idowu
(74) *Attorney, Agent, or Firm* — Morgan, Lewis & Bockius LLP; Manita Rawat

(57) ABSTRACT

A privacy system includes a computing device configured to obtain user transactional data characterizing at least one transaction of a user on an ecommerce marketplace and to determine a privacy vulnerability score of the user by comparing the transactional data to a user vulnerability distribution. The computing device is also configured to send the privacy vulnerability score to a personalization engine.

15 Claims, 8 Drawing Sheets

METHODS AND APPARATUSES FOR IDENTIFYING PRIVACY-SENSITIVE USERS IN RECOMMENDER SYSTEMS

TECHNICAL FIELD

The disclosure relates generally to methods and apparatuses for privacy-sensitive users in recommender systems.

BACKGROUND

At least some ecommerce marketplaces can include recommender systems that can provide recommendations to users that may be shopping, browsing or otherwise interacting with the marketplace. Recommender systems can use historical data from users to recommend items for purchase. Recommender systems can use models, algorithms or other methods to recommend items to users. The models, algorithms or other methods can use traditional open source packages or traditional algorithms to recommend such items to users.

Malicious actors can operate on the internet and on ecommerce marketplaces. The malicious actors can attempt to collect private information about other users and use this private information for their own self interests. Different users can have different levels of privacy sensitivity due to the potential risk of private information being obtained by such malicious actors. In instances where malicious actors are able to collect private information about users with a heightened privacy sensitivity, the operators (e.g., retailers) of the ecommerce marketplaces can suffer undesirable consequences such as decreased traffic and decreased customer trust. This, in turn, can lead to reduced revenues, increased costs, lower profits and lower customer satisfaction. There is a need, therefore, for methods and systems that can identify customers that may have a need for increased privacy protections.

SUMMARY

The embodiments described herein are directed to methods and apparatuses for identifying privacy-sensitive users in recommender systems. The embodiments described herein can be implemented using one or more computing devices that can include operative elements that can determine a vulnerability score for users of an ecommerce marketplace or other internet-based tool. In various embodiments, the computing devices can algorithmically identify users that are more sensitive to privacy attacks and take steps to ensure that the privacy-sensitive users are protected. In some examples, the computing devices can determine a privacy vulnerability score that can indicate the level of sensitivity that a user may have to a privacy attack. The privacy vulnerability score can create an application protocol interface (API) to make the privacy vulnerability score available to various personalization engines that may operate within the ecommerce marketplace or other internet-based tool. In this manner, the user's experience on the ecommerce marketplace or other internet-based tool can be customized to the user's privacy needs without the user's intervention.

In accordance with various embodiments, exemplary systems may be implemented in any suitable hardware or hardware and software, such as in any suitable computing device. For example, in some embodiments, a privacy system can include a computing device configured to obtain user transactional data characterizing at least one transaction of a user on an ecommerce marketplace and to determine a privacy vulnerability score of the user by comparing the transactional data to a user vulnerability distribution. The computing device can also be configured to send the privacy vulnerability score to a personalization engine.

In one aspect, the user vulnerability distribution can be determined using a trained privacy vulnerability model.

In another aspect, the trained privacy vulnerability model can be trained using a generative adversarial network.

In another aspect, the trained privacy vulnerability model can be trained using a training method that includes obtaining user beacon data characterizing actual customer transaction data on the ecommerce marketplace and generating user sample data characterizing artificial customer transaction data on the ecommerce marketplace. The training methods can also include inputting the user beacon data and the user sample data into the privacy vulnerability model to discriminate between the user beacon data and the user sample data.

In another aspect, the personalization engine can create an application protocol interface (API) to allow access to the privacy vulnerability score.

In another aspect, the personalization engine can implement at least one privacy preserving measure if the privacy vulnerability score is greater than a privacy vulnerability threshold.

In another aspect, the customer transaction data can include activity sequence data, contextual data and taxonomy data.

In some embodiments in accordance with the present disclosure, a method of identifying privacy-sensitive users is provided. The method can include obtaining user transactional data characterizing at least one transaction of a user on an ecommerce marketplace and determining a privacy vulnerability score of the user by comparing the transactional data to a user vulnerability distribution. The method can also include sending the privacy vulnerability score to a personalization engine.

In some embodiments in accordance with the present disclosure, a non-transitory computer readable medium is provided. The non-transitory computer readable medium can have instructions stored thereon, wherein the instructions, when executed by at least one processor, cause a device to perform operations that can include obtaining user transactional data characterizing at least one transaction of a user on an ecommerce marketplace and determining a privacy vulnerability score of the user by comparing the transactional data to a user vulnerability distribution. The instructions can also cause the device to send the privacy vulnerability score to a personalization engine.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
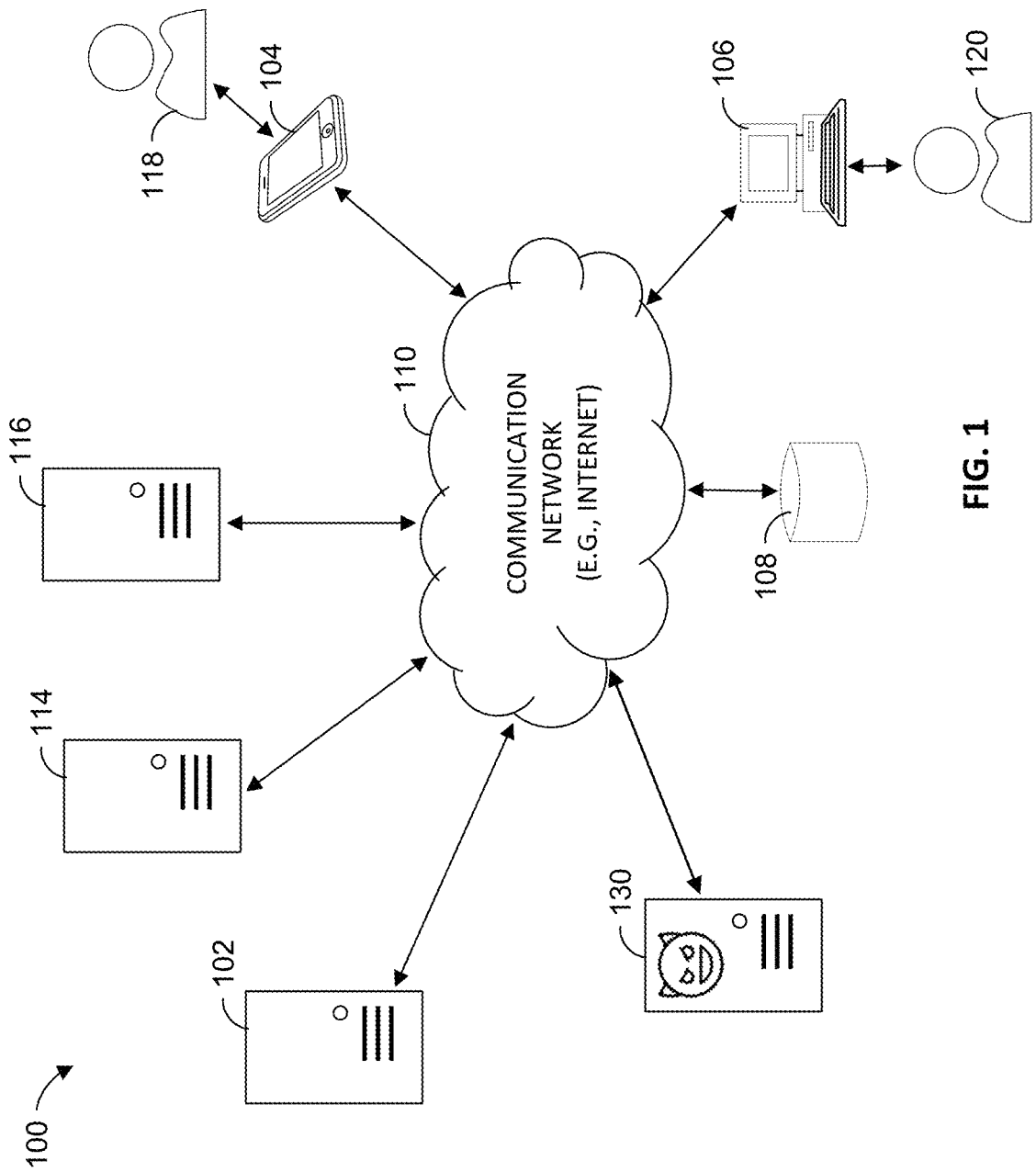
FIG. 1 is a block diagram of a privacy identifier system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some ecommerce marketplaces, the marketplace can include a recommender system that can operate to provide recommendations to the users that are using the marketplace. The recommender systems can, for example, provide recommendations to the users such as recommended substitute items, recommended items for purchase or other recommendations. These recommendations can be presented or displayed to the users by showing such recommended items on the ecommerce marketplace website. Some recommender systems include traditional methods to determine the recommendations. With some knowledge of the way in which the recommendations are determined, malicious actors can track or otherwise monitor the recommendations presented to users in order to determine information that may be otherwise unknown. In this manner, malicious actors can, in some circumstances, use the results of the recommender systems to determine private information of users.

In one example, a user may be a business that uses the ecommerce marketplace to create proprietary products. Malicious actors can monitor or track the recommendations of the ecommerce marketplace to determine private information of the business. In this example, the user can be a bakery that has a secret recipe for one of its baked items. Because recommender systems often use historical transaction data to determine recommendations, the recommender system of the ecommerce marketplace is likely to use historical transaction data that includes repeated instances of purchases of the items that may be included in the secret recipe for the bakery's products. A malicious actor can monitor or track the recommendations presented recommender system to determine one or more of the ingredients in the secret recipe. This result is unacceptable and could result in decreased trust of the retailer that operates the ecommerce marketplace. The methods and apparatuses of the present disclosure can identify which users are privacy-sensitive users. The recommender system can then take other actions to protect the private information of the privacy-sensitive users.

In some examples, the privacy identifier systems of the present disclosure can determine a privacy vulnerability score for a user by comparing aspects of the user's interactions with the ecommerce marketplace with other users' interactions on the ecommerce marketplace. If a particular user's activity is atypical or departs from the activity taken by other users, the particular user's activity and information is more susceptible to privacy attacks by malicious actors. This is the case because an atypical user's activity may not be masked by the numerous other users that may take similar actions on the ecommerce marketplace. By identifying such atypical users, the privacy identifier systems of the present disclosure can designate such users as privacy-sensitive users using a privacy vulnerability score.

The description below describes example privacy identifier systems that may be included in the context of recommender systems of retail or grocery ecommerce marketplaces. It should be appreciated, however, that the methods and apparatuses of the present disclosure can be applied in other industries and in other contexts. In other examples, the methods and apparatuses described herein can be used in financial, manufacturing, health, accounting, and other industries to identify users that may be atypical and may be privacy-sensitive or require increased protections.

Turning to the drawings, FIG. 1 illustrates a block diagram of an example privacy identifier system 100 that includes a sensitivity identifier 102 (e.g., a server, such as an application server), a central ordering computing device 114, a customization computing device 116 (e.g., a web server), a database 108, and multiple user computing devices 104, 106 operatively coupled over network 110. A malicious actor computing device 130 can also be coupled to the network 110. Sensitivity identifier 102, central ordering computing device 114, customization computing device 116, malicious actor computing device 130, and multiple user computing devices 104, 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, sensitivity identifier 102 can be a computer, a workstation, a laptop, a server such as a cloud-based server, or any other suitable device. In some examples, each of the multiple user computing devices 104, 106 can be a cellular phone, a smart phone, a tablet, a personal assistant device, a voice assistant device, a digital assistant, a laptop, a computer, or any other suitable device. In some examples, sensitivity identifier 102 and the central ordering computing device 114 can be operated and/or controlled by a retailer, and multiple user computing devices 104, 106 are operated by users or customers. The malicious actor computing device 130 can be operated by a malicious user, hacker or other entity attempting to obtain private information of the users 118, 120.

The central ordering computing device 114 can be distributed among one or more workstations or servers that are coupled together over the network 110. The central ordering computing device 114 can cause an ecommerce marketplace to be displayed or otherwise communicated via one or more websites. The users 118 can view, browse and order items that may be made available via the ecommerce marketplace. The central ordering computing device 114 can collect information for such orders including item information, payment information, delivery information and the like. The central ordering computing device 114 can store such information and/or send such information for storage in the database 108 or in other components of the privacy identifier system 100.

The customization computing device 116 can also be distributed among one or more workstations or servers that are coupled together over the network 110. In other examples, the customization computing device 116 can be a single computing device as shown. The customization computing device 116 can include various personalization engines that can deliver customized or personalized content, information or other data to the central ordering computing device 114 and/or to other elements of the system. The customization computing device 116 can be a recommender system, for example, that can deliver recommendations to the user computing devices 104, 106. The recommender system, for example, can include upsell recommendations such as recommendations from similar categories that can be presented to the users as "Similar Items To Ones You Are Viewing" or under a similar listing. The recommender system, for example can also include crosssell recommendations such as recommendations for complimentary categories that can be presented to users as "Users Who Bought This Also Bought" or under a similar listing. In other examples, the customization computing device 116 can be a fraud identification computing device. As will be further described, the sensitivity identifier 102 can determine a user's sensitivity to a privacy attack and provide such privacy vulnerability information to the customization computing device 116 and/or to the central ordering computing device 114.

Sensitivity identifier 102 can also be operable to communicate with database 108 over the communication network 110. The database 108 can be a remote storage device, such as a cloud-based server, a memory device on another application server, a networked computer, or any other suitable remote storage. Although shown remote to sensitivity identifier 102, in some examples, database 108 can be a local storage device, such as a hard drive, a non-volatile memory, or a USB stick.

Communication network 110 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

The user computing devices 104, 106 may communicate with the central ordering computing device 114 over communication network 110. For example, the central ordering computing device 114 may host one or more ecommerce marketplaces on one or more websites. Each of the user computing devices 104, 106 may be operable to view, access and interact with the websites hosted by the central ordering computing device 114. In some examples, the central ordering computing device 114 can allow a user 118, 120, via the user computing devices 104, 106, to browse, search and/or select products for purchase. As will be further explained, the central ordering computing device 114 can also personalize the websites through the display of recommendations or through other personalized content via the user computing device 104, 106.

The malicious actor computing device 130 can be operated by a malicious actor, for example. The malicious actor can monitor and/or track the personalized aspects of the ecommerce marketplace in an attempt to obtain private information about the users 118, 120. In the example described above, the malicious actor can monitor the recommended items that may be displayed on the ecommerce marketplace in order to obtain information about recipes or other proprietary information of the user 118 and/or the user 120.

Figure 2:
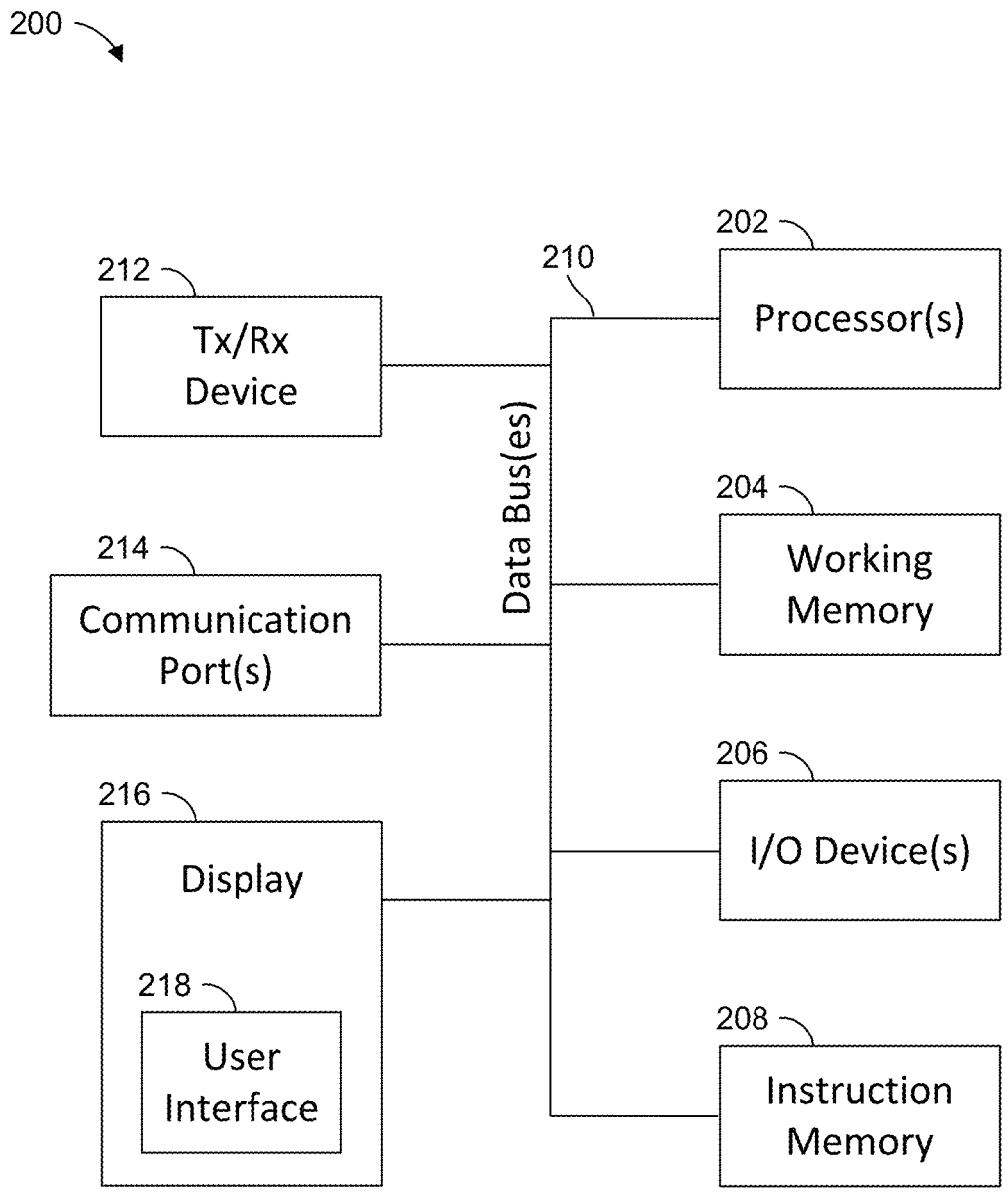
FIG. 2 is a block diagram of a computing device of the system of FIG. 1 in accordance with some embodiments.

FIG. 2 illustrates an example computing device 200. The sensitivity identifier 102, the central ordering computing device 114, the customization computing device 116, and/or the user computing devices 104, 106 may include the features shown in FIG. 2. For the sake of brevity, FIG. 2 is described relative to the sensitivity identifier 102. It should be appreciated, however, that the elements described can be included, as applicable, in the central ordering computing device 114, the customization computing device 116, and/or the user computing devices 104, 106.

As shown, the sensitivity identifier 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the sensitivity identifier 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as user transactional data, activity sequence data, contextual data and taxonomy data.

Display 216 can display a user interface 218. User interfaces 218 can enable user interaction with the sensitivity identifier 102. For example, user interface 218 can be a user interface that allows an operator to interact, communicate, control and/or modify different features or parameters of the sensitivity identifier 102. The user interface 218 can, for example, display the performance of the sensitivity identifier 102 and/or a user vulnerability distribution using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 sensitivity identifier 102 will be operating in. Processor(s) 202 is operable to receive data from, or send data to, a network, such as communication network 110 of FIG. 1, via transceiver 212.

Figure 3:
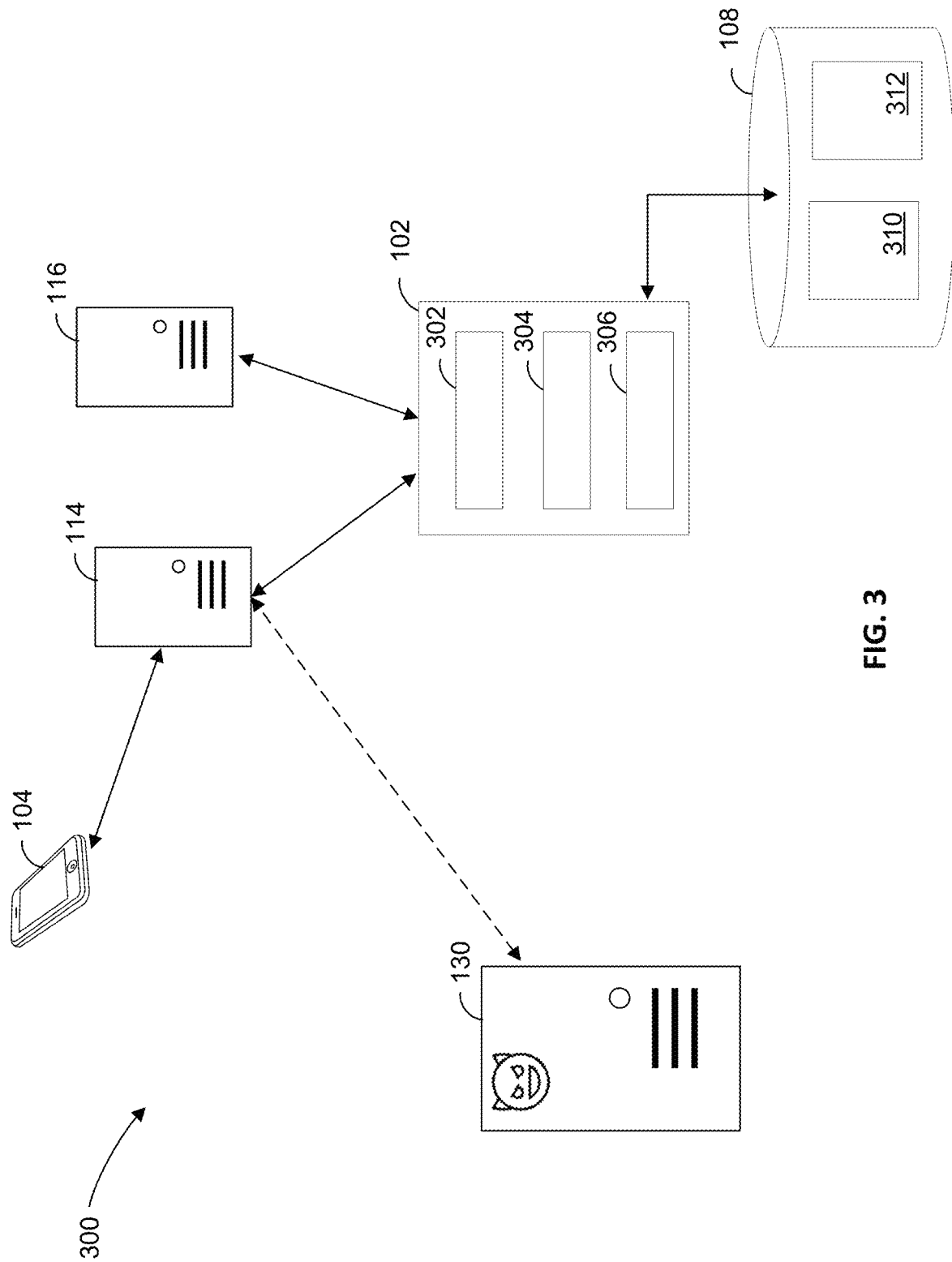
FIG. 3 is a block diagram illustrating examples of various portions of the privacy identifier system of FIG. 1.

Turning now to FIG. 3, an example privacy identifier system 300 is shown. The privacy identifier system 300, in this example, includes sensitivity identifier 102, central ordering computing device 114, customization computing device 116, and database 108. The sensitivity identifier 102 can be coupled to the central ordering computing device 114, the customization computing device 116 and the database 108 using any suitable wired or wireless connection such as by network 110 previously described. The user computing device 104 can also be coupled to the central ordering computing device 114 and/or to the sensitivity identifier 102. The malicious actor computing device 130 can also be coupled to the central ordering computing device 114, to the customization computing device 116 and/or to the sensitivity identifier 102.

The sensitivity identifier 102 can operate to identify the vulnerability or sensitivity of users to privacy attacks. The sensitivity identifier 102 can, in this example, include a data acquisition engine 302, a privacy vulnerability model 304 and a personalization engine 306. The data acquisition engine 302 can be any suitable application or other interface that can use suitable protocols to obtain data from other computing devices such as from the central ordering computing device 114, database 108 and/or from the customization computing device 116. The data acquisition engine 302 can, for example, include suitable application protocol interfaces (APIs) that can enable the data acquisition engine 302 to obtain user transaction data from the central ordering computing device 114 that can describe the interactions of a user on the ecommerce marketplace.

Such user transaction data can include activity sequence data that can include information about the sequence of actions that a user performs on the ecommerce marketplace. Such user transaction data or user activity data can include an information regarding a users activity on the ecommerce marketplace such as user clicks, views, add-to-carts, hovers, searches, etc. The user transaction data can also include contextual data. The contextual data can include information that provides context to a user's actions. Contextual data can include, for example, time spent on the ecommerce marketplace, click-through information, date and/or seasonality information, and the like. The user transaction data can also include taxonomy data. Taxonomy data can include information regarding the classification and/or organization information about the items that the user may have viewed and/or purchased on the ecommerce marketplace. The taxonomy data can, for example, include the categorical information about items on the marketplace. In retail or grocery marketplaces, for example, the taxonomy information can indicate whether the items are in dry goods, frozen goods, dairy products, beverages, produce or the other categories of goods. The taxonomy data can use the organization structure used by the retailer to organize items in the ecommerce marketplace. In other examples, other types of data can also be used and obtained by the data acquisition engine 302.

The privacy vulnerability model 304 can be any suitable application, algorithm, machine learning model or the like that can identify users that may be vulnerable to privacy attacks. The privacy vulnerability model 304 can, for example, be a trained machine learning model that can determine a vulnerability score for each user that, in turn, can be used to determine the strictness or protections that can be applied to preserve the user's private information. In one example, the privacy vulnerability model 304 can be a trained adversarial model that can use users' historical transactional data and can generate synthetic customer data to determine a distribution of users' behavior. The privacy vulnerability model can determine a particular user's vulnerability score and compare the vulnerability score to the user vulnerability distribution. Based on this comparison, the privacy vulnerability model can determine whether the particular user is vulnerable to a privacy attack.

The personalization engine 306 can operate to share the privacy vulnerability score or other information that may be determined by the sensitivity identifier 102 with other devices and other services that the retailer and/or the ecommerce marketplace may offer. The personalization engine 306 can, for example, store the vulnerability scores for each user and/or create an application protocol interface (API) that allows other teams within the retailer's organization to access and use the privacy vulnerability scores. In some instances, the privacy vulnerability scores that are shared by the personalization engine 306 can be used as inputs to other engines or models that can be implemented by the retailer and/or the ecommerce marketplace. For example, the personalization engine 306 can send or make the privacy vulnerability scores available to recommender systems that are implemented in the ecommerce marketplace. In other examples, the fraud department and/or fraud identification models of the retailer can access and/or use the privacy vulnerability scores.

The sensitivity identifier 102 can also be coupled to the database 108. The sensitivity identifier 102 can access various types and quantities of data from the database 108. The database 108 can include user transaction data 310 and user privacy vulnerability scores 312. The privacy vulnerability scores 312 can be, for example, be determined by the privacy vulnerability model 304. The sensitivity identifier 102 can then store the user privacy vulnerability scores 312 in the database 108. In some examples, the customization computing device 116 (or other elements of the privacy identifier system 300) can obtain the user privacy vulnerability scores 312 directly from the database 108.

Figure 4:
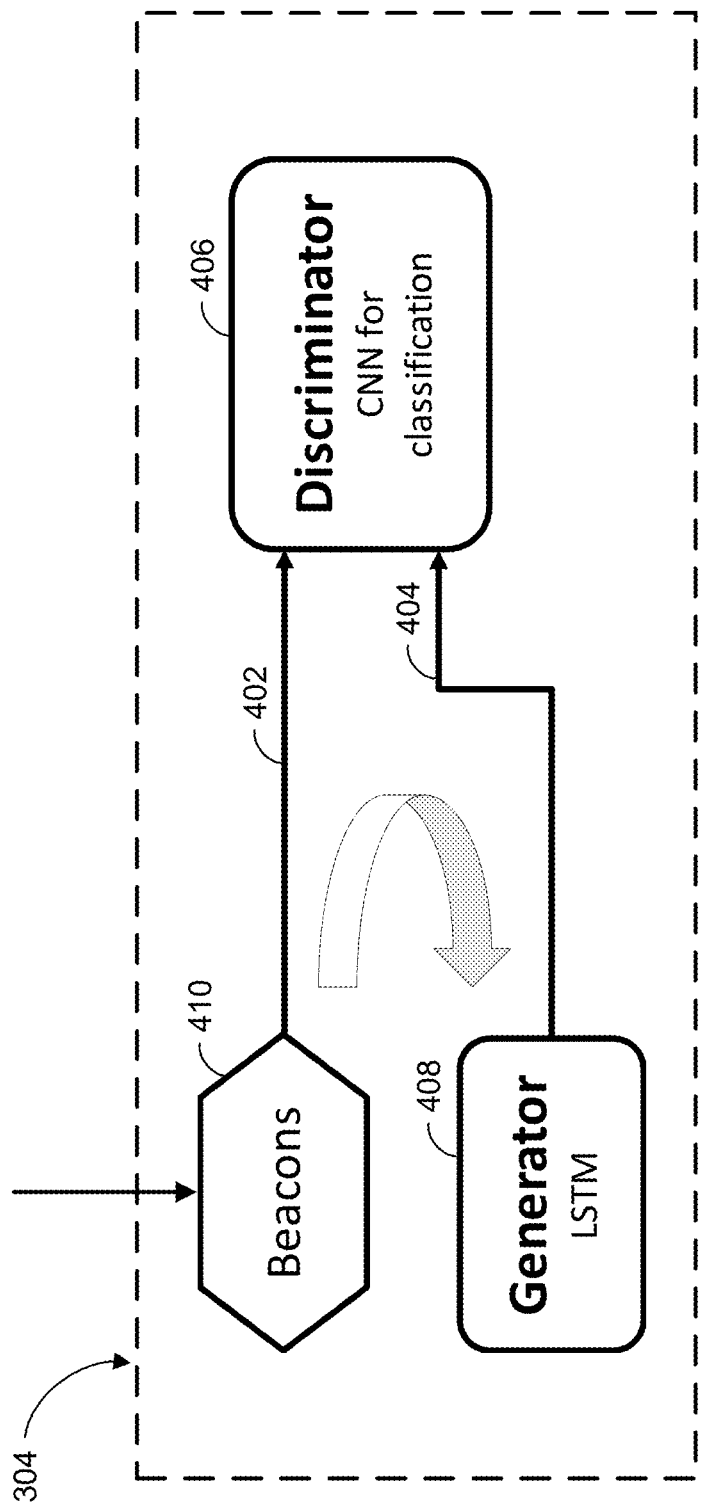
FIG. 4 is a block diagram showing an example privacy vulnerability model and elements thereof in accordance with some embodiments.

Referring now to FIG. 4, an example privacy vulnerability model 304 is shown. In this example, the privacy vulnerability model 304 is shown in a training mode. The privacy vulnerability model 304 can be a machine learning model that is trained in order to learn a true distribution of user behavior on the ecommerce marketplace. Once the true user distributions are determined by the privacy vulnerability model 304, a user's activity on the ecommerce marketplace can be compared to the true user distribution(s) to determine whether the user is susceptible to a privacy attack.

The privacy vulnerability model 304 can be trained using various machine learning training techniques. In one example, as shown in FIG. 4, the privacy vulnerability model 304 can be trained using a generative adversarial network. Any suitable open source or proprietary machine learning tools, packages or libraries can be used to train the privacy vulnerability model 304 using the generative adversarial network. In this example, the privacy vulnerability model 304 can be trained by inputting data regarding true user transactions 402 and data regarding generated negative user transactions 404 into a discriminator 406. The discriminator 406 can use a convolutional neural network (CNN) to differentiate between the true user transactions 402 and the generated negative user transactions 404. The discriminator 406 refines and learns to differentiate between the true user transactions 402 and the generated negative user transaction 404. In this manner, the discriminator 406 can use machine learning to learn the difference between a true user transaction 402 and a generated negative user transaction 404.

The generated negative user transactions 404 can include data that is an attempt by the generator 408 to simulate an actual or true user transaction. The generator 408 can use, for example, Long Short-Term Memory (LSTM) networks or other recurrent neural networks to generate the synthetic or simulated user transactions. The generator 408 can use an iterative or recurrent process to generate progressively better samples (i.e., samples that more closely simulate actual user transactions) that, in turn, improve the discriminator's ability to differentiate between true and generated user transactions.

The true user transaction data 402 can be obtained from beacons 410. The beacons 410 can be user transaction data previously described and can include various types of data that can describe a user's interactions with the ecommerce marketplace as well as data that can describe the items, arrangement, content and/or organization of the ecommerce marketplace. The beacons can include, for example, user activity sequence data, contextual data and taxonomy data. The beacons 410 can be collected and stored in any suitable manner and can be obtained by the data acquisition engine 302, for example, and input into the privacy vulnerability model 304.

Figure 5:
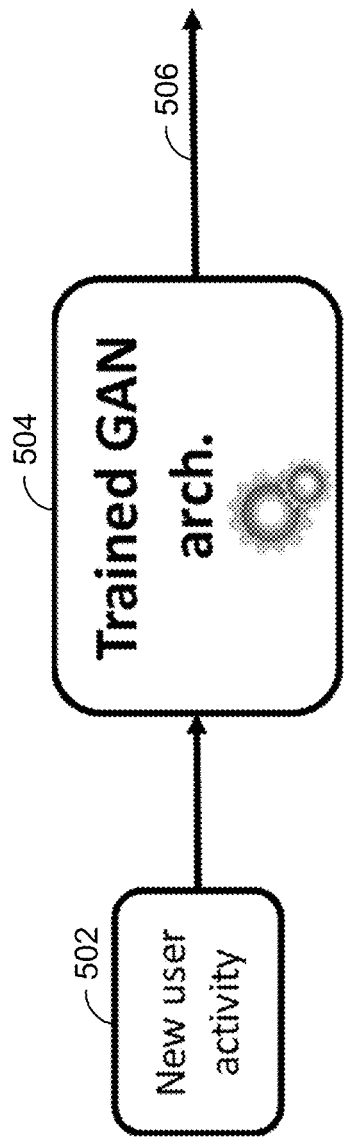
FIG. 5 is a block diagram showing the example privacy vulnerability model of FIG. 4 after being implemented.

After training the privacy vulnerability model 304 using a generative adversarial network as depicted in FIG. 4, the result is a trained privacy vulnerability model. A trained privacy vulnerability model 504 is shown in FIG. 5. The trained privacy vulnerability model 504 can have a generative adversarial network (GAN) architecture as previously described. The trained privacy vulnerability model 504 can, by using the training architecture previously described, learn the true distributions of true user transactions. When the trained privacy vulnerability model 504 is implemented, new user activity 502 can be input into the trained privacy vulnerability model 504. The new user activity 502 can, for example, be data that describes a user's activity or interactions with the ecommerce marketplace. The trained privacy vulnerability model 504 can compare the new user activity 502 to the learned user distributions. If the new user activity meets or falls within or outside predetermined zones of the learned user distributions, the user can be classified as being either privacy safe (i.e., less vulnerable to a privacy attack) or privacy vulnerable (i.e., highly vulnerable to a privacy attack). A vulnerability score 506 can be used to describe the user as privacy vulnerable or privacy safe. The vulnerability score 506 can be an output of the trained privacy vulnerability model 504.

Figure 6:
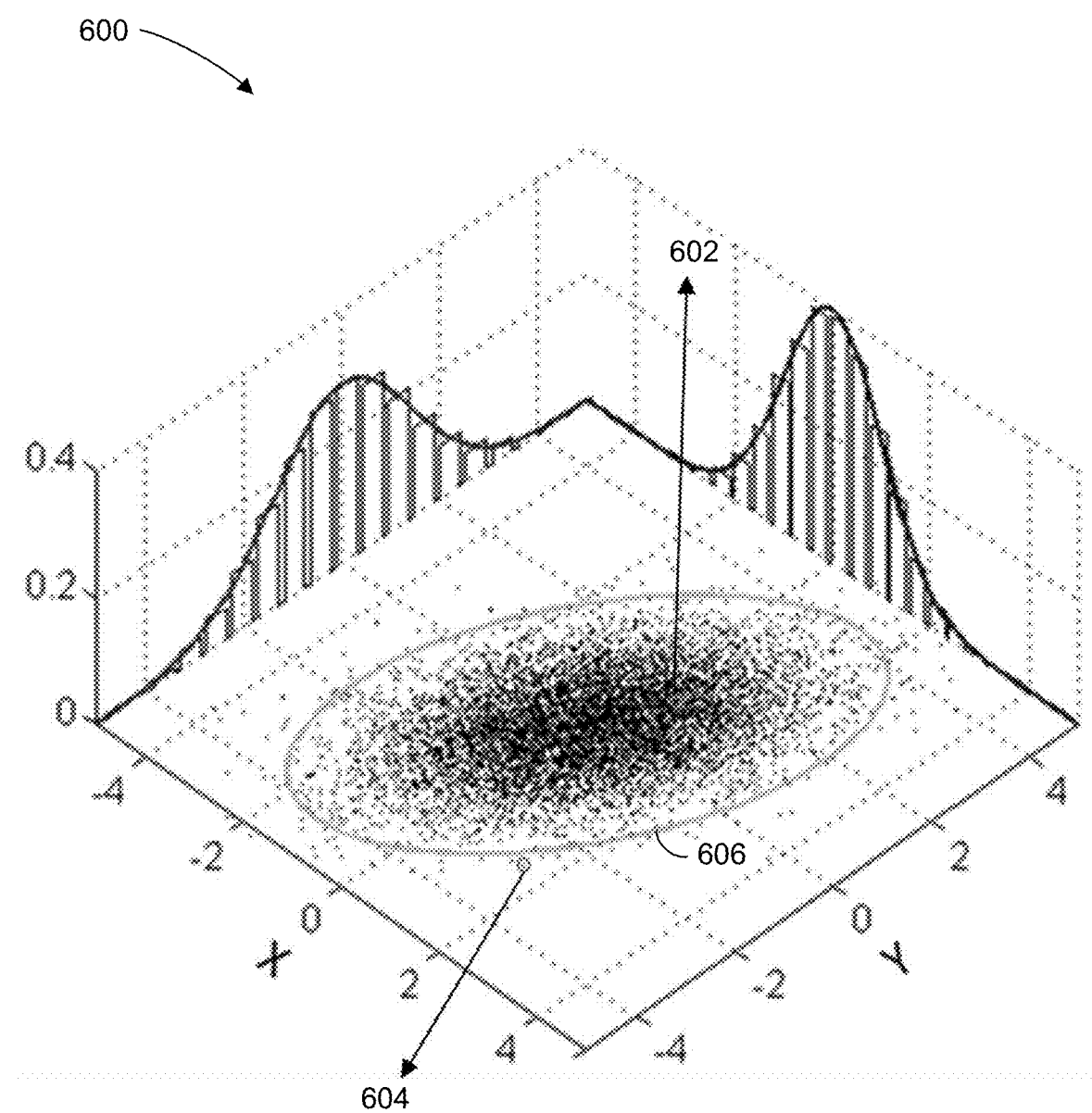
FIG. 6 is an illustration of an example vulnerability distribution determined by the privacy identifier system of FIG. 1.

Referring now to FIG. 6, an example graphical representation of a user distribution is shown. The graphical representation of the user distribution 600 in this example is displayed using three dimensions X, Y, and Z. In other examples, the trained privacy vulnerability model 504 can use any number of dimensions to describe the distribution of users. Each of the data points on the user distribution 600 can represent a different user that has interacted on the ecommerce marketplace. As can be seen, many of the users are densely positioned together at or near the origin of the user distribution 600. When a user's activity corresponds to movement away from the origin along one or more of the dimensions in the user distribution 600, there are fewer users that take similar actions. As can be appreciated, the users that have more unique interactions on the ecommerce marketplace are more likely to be positioned apart from other users. In such circumstances, the actions of these users are not masked or are not aggregated with a significant number of other users. These atypical users that are not masked or aggregated with other users are more vulnerable to a privacy attack because their actions are more likely to leak out of the recommender system to a malicious actor. In other words, a typical user 602 (that takes action like many other users) is less vulnerable than a unique or atypical user 604.

The sensitivity identifier 102 can identify a vulnerability boundary 606 that can be associated with the user distribution 600. The vulnerability boundary 606 can define a predetermined threshold or limit that can separate the privacy vulnerable users from the privacy safe users. The vulnerability boundary 606 can be determined using any suitable process. In some examples, the vulnerability boundary 606 can be defined after reviewing the user distribution 600 in order to meet a desired level risk level. In other examples, the vulnerability boundary 606 can be determined automatically by the sensitivity identifier 102 and can be set at a desired probability level that may be associated with the user distribution 600. In still other examples, the vulnerability boundary 606 can be set relative to a percentage of users that may fall within or outside of the vulnerability boundary 606. In still other examples, the vulnerability boundary 606 can be set using a standard deviation of the user transaction data. In the example shown, the vulnerability boundary has a smooth rounded shape. In other examples, the vulnerability boundary can have other shapes, contours and can be symmetrical or asymmetrical with respect to the various dimensions that may define the user distribution 600.

The sensitivity identifier 102 can determine a vulnerability score for a user based on the comparing a user's activity on the ecommerce marketplace to the user distribution 600 along the various dimensions of the user distribution 600. In some examples, the vulnerability score can be a numerical value. In still other examples, the vulnerability score can be a multi-variable score that describes the user's position on the user distribution 600. For example, the atypical user 604 can have a vulnerability score of approximately (1.8, −2.8) that describes the user's position in the (X, Y) plane of the user distribution 600. The typical user 602, in this example, can have a vulnerability score of approximately (1.4, 0.4) that describes the typical user's position in the (X, Y) plane. In other examples and with other user distributions, the vulnerability score can be described in other manners or with more or less dimensions.

Figure 7:
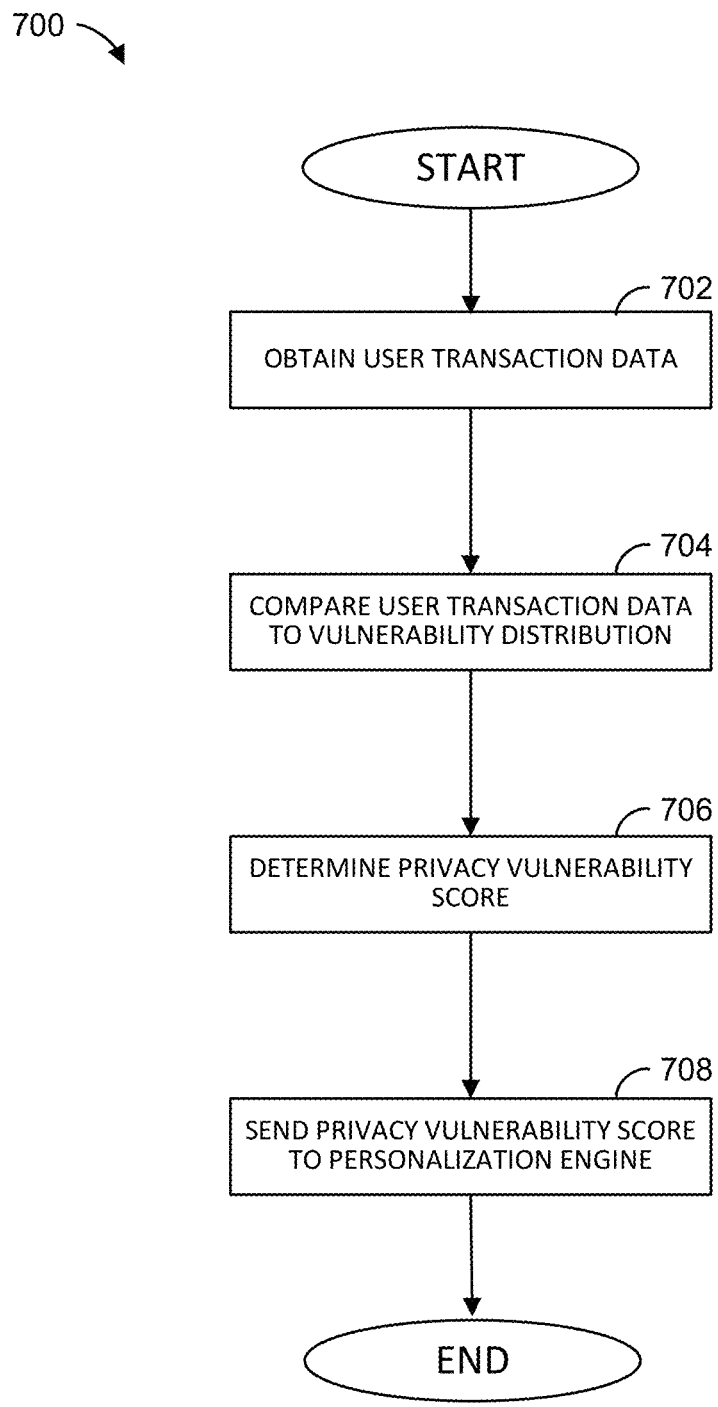
FIG. 7 is a flowchart of an example method of identifying a privacy-sensitive user in accordance with some embodiments.

Referring now to FIG. 7, an example method 700 of identifying a privacy sensitive user is shown. The method 700 can be performed by one or more of the systems and components described in the present disclosure. The method 700 can be performed by the privacy identifier system 100, 300, for example. The description below describes the method 700 in the context of the privacy identifier system 300. It should be appreciated, however, that the method 700 or various steps thereof can be performed by other systems and devices.

At step 702, the sensitivity identifier 102 can obtain user transaction data. The sensitivity identifier 102 can obtain the user transaction data using any suitable technique. In one example, the data acquisition engine 302 of the sensitivity identifier 102 can obtain the user transaction data from the central ordering computing device 114. A user 118 can be accessing the ecommerce marketplace using a user computing device 104. The user transaction data can be collected and/or recorded by the central ordering computing device 114. The user transaction data can characterize the user's interactions with the ecommerce marketplace. In some examples, the user transaction data can include activity sequence data, contextual data and taxonomy data among other information.

At step 704, the sensitivity identifier 102 can compare the user transaction data to a privacy vulnerability distribution. As previously explained, the sensitivity identifier 102 can include a trained machine learning model such as a privacy vulnerability model with a generative adversarial network architecture. The trained privacy vulnerability model can have been trained using adversarial training such as by method 800 described below. As a result of the training, the sensitivity identifier 102 can have learned a user distribution that describes a distribution of user behavior using one or more dimensions.

At step 706, the sensitivity identifier 102 can determine a privacy vulnerability score. The privacy vulnerability score can characterize a sensitivity of the user to a privacy attack. For example, the privacy vulnerability score can characterize whether the user is positioned inside (or outside) a vulnerability boundary on the user distribution. In another example, the vulnerability score can be compared to a predetermined vulnerability threshold.

At step 708, the sensitivity identifier 102 can send the privacy vulnerability score to a personalization engine. The personalization engine, in turn, can use the privacy vulnerability score as an input to take further action. For example, if the privacy vulnerability score indicates that the user is privacy sensitive, the personalization can take action to protect the private information of the user. For example, in a personalization engine such as a recommender system, the recommender system can display common recommended items rather than personalized recommendations if the user is identified as a privacy sensitive user. By recommending common recommended items rather than personalized recommendations, a malicious actor is less likely to be able to collect private information of the privacy sensitive user. In other examples, other actions can be taken to protect the private information of the privacy sensitive user.

In some examples, the personalization engine can create an application protocol interface (API). The API can then be used to send or otherwise make the vulnerability scores available to various other customization computing devices 116 that may provide other services to the user by the retailer. For example, the vulnerability scores can be used by financial, accounting, fraud-identification or other departments of the retailer to protect the private information of the user.

Figure 8:
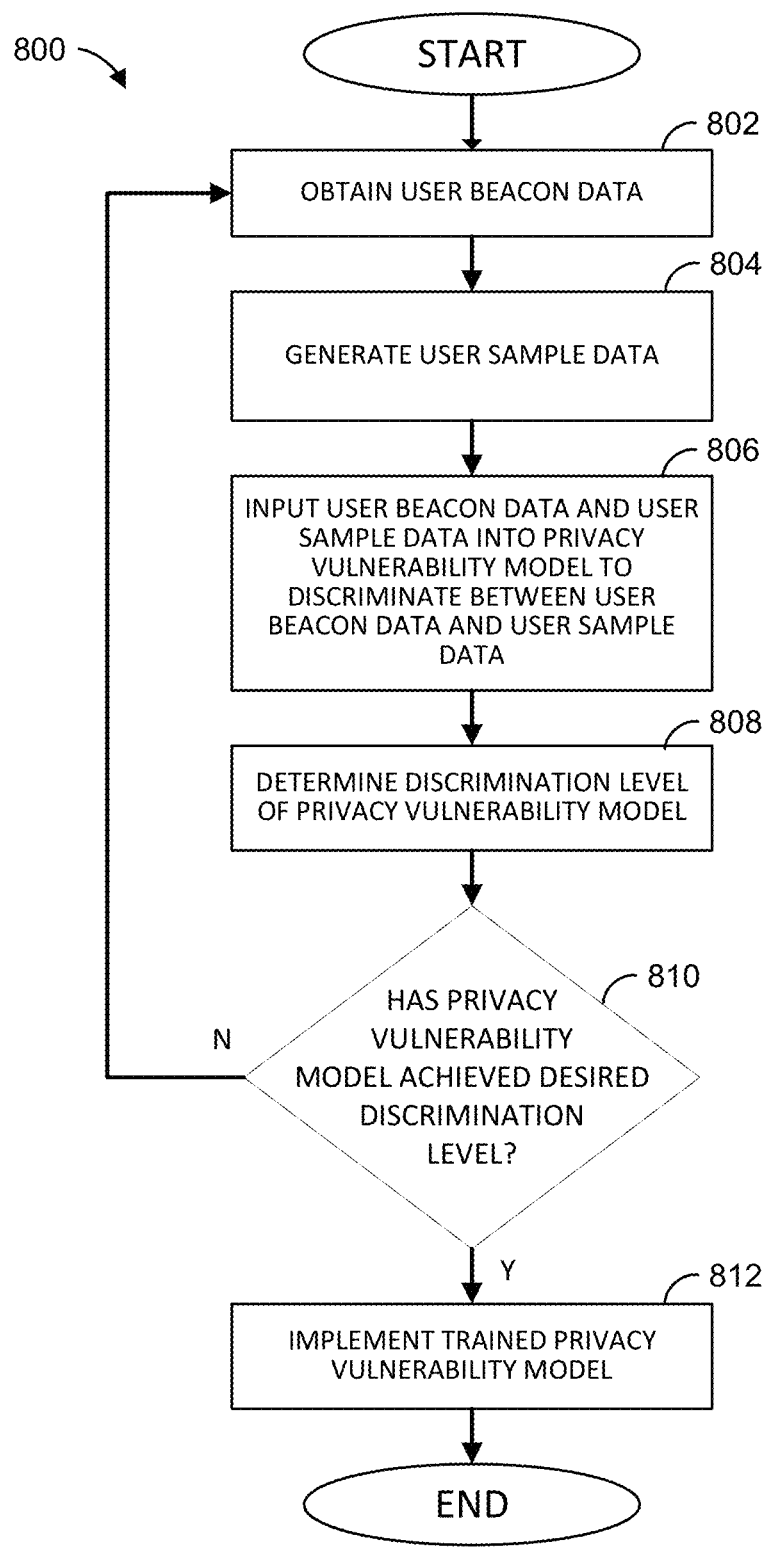
FIG. 8 is a flowchart of an example method of training a private recommendation model in accordance with some embodiments.

Referring now to FIG. 8, a method 800 of training a privacy vulnerability model is shown. The method 800 can be used to train the privacy vulnerability model that is used in method 700. At step 802, the sensitivity identifier 102 can obtain user beacon data. User beacon data can be the beacons 410 previously described. The user beacon data can characterize true or actual user interactions with the ecommerce marketplace. The user beacon data can be obtained using any suitable technique such as, for example, obtaining historical user transaction data from the database 108.

At step 804, the sensitivity identifier 102 can generate user sample data. The user sample data can be generated negative user transactions 404 previously described. The user sample data can be simulated or synthetic user transaction data. A generator in a generative adversarial network such as generator 408 (FIG. 4) can be used to generate the user sample data.

At step 806, the user beacon data and the user sample data is input into a privacy vulnerability model to discriminate between the user beacon data and the user sample data. The privacy vulnerability model can use a convolutional neural network (such as discriminator 406) to discriminate between the true users (i.e., the user beacon data) and the fake users (i.e., the user sample data). This process can be repeated using adversarial training.

At step 808, sensitivity identifier 102 can determine a discrimination level of the privacy vulnerability model. Any suitable performance measure can be used. The performance measure can measure the ability of the privacy vulnerability model to accurately differentiate between the user beacon data and the user sample data.

At step 810, the sensitivity identifier 102 can decide whether the privacy vulnerability model has achieved a desired discrimination level. The sensitivity identifier 102 can decide by comparing the discrimination level determined at step 808 to a predetermined (or desired) discrimination level. If the discrimination level of the privacy vulnerability model is greater than or equal to the desired discrimination level, the method moves to step 812. If the discrimination level of the privacy vulnerability model is less than the desired discrimination level, the method returns to step 802. Because the discrimination level of the model is too low, further training is required. The method 800 can return to step 802 to repeat steps 802 through 810 until such time as the privacy vulnerability model performs to the desired level.

At step 812, the privacy vulnerability model can be implemented. When the privacy vulnerability model is implemented, the privacy vulnerability model can perform the method 700 previously described and has learned the true user distributions so that it can accurately identify privacy sensitive users.

The foregoing examples focused on descriptions of the principles and teachings of the present disclosure used in the context of a retailer and an ecommerce marketplace. As can be appreciated, the methods and apparatuses described herein can be applied in various contexts and in various industries. The method and apparatuses of the present disclosure can identify privacy sensitive users so that further actions can be taken to protect the private information of the privacy sensitive users. In this manner, customer satisfaction and trust can be improved over that of existing recommender or other personalization systems.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
   train a privacy vulnerability model to generate a privacy vulnerability score, wherein the privacy vulnerability model is trained using a generative adversarial network configured to receive historical user transactions and generated user transactions;
   obtain transactional activity data characterizing at least one transaction of a user;
   determine the privacy vulnerability score of the user by providing the transactional activity data of the user to the privacy vulnerability model, wherein the user is classified based on the privacy vulnerability score and a user vulnerability distribution, wherein the transactional activity data comprises:
      activity sequence data including information about a sequence of actions associate with the user;
      contextual data providing context information of the sequence of actions; and
      taxonomy data including classification and organization information about items the user has interacted with; and
   send the privacy vulnerability score to a personalization engine configured to generate an application protocol interface API to allow access to the privacy vulnerability score by a plurality of personalization engines, wherein at least one of the plurality of personalization engines is configured to automatically personalize an interface provided to the user based on the classification of the user.

2. The system of claim 1, wherein the user vulnerability distribution is determined during training of the privacy vulnerability model.

3. The system of claim 1, wherein the privacy vulnerability model is trained using a training method comprising:
   obtaining user beacon data characterizing actual customer transaction data on the ecommerce marketplace;
   generating user sample data characterizing artificial customer transaction data on the ecommerce marketplace; and
   inputting the user beacon data and the user sample data into the privacy vulnerability model to discriminate between the user beacon data and the user sample data.

4. The system of claim 2, wherein the personalization engine implements at least one privacy preserving measure if the privacy vulnerability score is greater than a privacy vulnerability threshold.

5. A method comprising:
   training a privacy vulnerability model to generate a privacy vulnerability score, wherein the privacy vulnerability model is trained using a generative adversarial network configured to receive historical user transactions and generated user transactions;
   obtaining transactional activity data characterizing at least one transaction of a user;
   determining the privacy vulnerability score of the user by providing the transactional activity data of the user to the privacy vulnerability model, wherein the user is classified based on the privacy vulnerability score and a user vulnerability distribution, wherein the transactional activity data comprises:
      activity sequence data including information about a sequence of actions associate with the user;

contextual data providing context information of the sequence of actions; and taxonomy data including classification and organization information about items the user has interacted with; and sending the privacy vulnerability score to a personalization engine configured to generate an application protocol interface API to allow access to the privacy vulnerability score by a plurality of personalization engines, wherein at least one of the plurality of personalization engines is configured to automatically personalize an interface provided to the user based on the classification of the user.

6. The method of claim 5, wherein the user vulnerability distribution is determined during training of the privacy vulnerability model.

7. The method of claim 5, wherein the privacy vulnerability model is trained using a training method comprising:

obtaining user beacon data characterizing actual customer transaction data on the ecommerce marketplace;

generating user sample data characterizing artificial customer transaction data on the ecommerce marketplace; and inputting the user beacon data and the user sample data into the privacy vulnerability model to discriminate between the user beacon data and the user sample data.

8. The method of claim 6, wherein the personalization engine implements at least one privacy preserving measure if the privacy vulnerability score is greater than a privacy vulnerability threshold.

9. A non-transitory computer readable medium having instructions stored thereon, wherein the instructions, when executed by at least one processor, cause a device to perform operations comprising:

training a privacy vulnerability model to generate a privacy vulnerability score, wherein the privacy vulnerability model is trained using a generative adversarial network configured to receive historical user transactions and generated user transactions;

obtaining transactional activity data characterizing at least one transaction of a user;

determining the privacy vulnerability score of the user by providing the transactional activity data of the user to the privacy vulnerability model, wherein the user is classified based on the privacy vulnerability score and a user vulnerability distribution, wherein the transactional activity data comprises:

activity sequence data including information about a sequence of actions associate with the user;

contextual data providing context information of the sequence of actions; and taxonomy data including classification and organization information about items the user has interacted with; and sending the privacy vulnerability score to a personalization engine configured to generate an application protocol interface API to allow access to the privacy vulnerability score by a plurality of personalization engines, wherein at least one of the plurality of personalization engines is configured to automatically personalize an interface provided to the user based on the classification of the user.

10. The non-transitory computer readable medium of claim 9, wherein the user vulnerability distribution is determined during training of the privacy vulnerability model.

11. The non-transitory computer readable medium of claim 9, wherein the privacy vulnerability model is trained using a training method comprising:

obtaining user beacon data characterizing actual customer transaction data on the ecommerce marketplace;

generating user sample data characterizing artificial customer transaction data on the ecommerce marketplace; and inputting the user beacon data and the user sample data into the privacy vulnerability model to discriminate between the user beacon data and the user sample data.

12. The non-transitory computer readable medium of claim 10, wherein the personalization engine implements at least one privacy preserving measure if the privacy vulnerability score is greater than a privacy vulnerability threshold.

13. The system of claim 1, wherein the privacy vulnerability model includes a discriminator including a convolutional neural network.

14. The method of claim 5, wherein the privacy vulnerability model includes a discriminator including a convolutional neural network.

15. The non-transitory computer readable medium of claim 9, wherein the privacy vulnerability model includes a discriminator including a convolutional neural network.

* * * * *